US011221502B2

(12) United States Patent
Winkelsas et al.

(10) Patent No.: US 11,221,502 B2
(45) Date of Patent: Jan. 11, 2022

(54) HEAD ALIGNMENT TRAINING DEVICE AND METHOD

(71) Applicants: Joseph Winkelsas, Buffalo, NY (US); Lisa Harwell, East Amherst, NY (US)

(72) Inventors: Joseph Winkelsas, Buffalo, NY (US); Lisa Harwell, East Amherst, NY (US)

( * ) Notice: Subject to any disclaimer, the term of this patent is extended or adjusted under 35 U.S.C. 154(b) by 291 days.

(21) Appl. No.: 16/693,257

(22) Filed: Nov. 23, 2019

(65) Prior Publication Data

US 2020/0174285 A1    Jun. 4, 2020

Related U.S. Application Data

(60) Provisional application No. 62/773,811, filed on Nov. 30, 2019.

(51) Int. Cl.
| G02C 7/16 | (2006.01) |
| G02C 7/10 | (2006.01) |
| G02C 5/00 | (2006.01) |
| A63B 69/36 | (2006.01) |

(52) U.S. Cl.
CPC ............. *G02C 7/16* (2013.01); *G02C 5/001* (2013.01); *G02C 7/104* (2013.01); *A63B 69/3608* (2013.01)

(58) Field of Classification Search
CPC .......... G02C 7/16; G02C 5/001; G02C 7/104; A63B 69/3608
See application file for complete search history.

(56) References Cited

U.S. PATENT DOCUMENTS

| 4,168,111 | A | | 9/1979 | Baines |
| 4,429,959 | A | * | 2/1984 | Walters .................. G02C 7/088 351/158 |
| 4,531,743 | A | | 7/1985 | Lott |
| 5,177,510 | A | | 1/1993 | Peters et al. |
| 5,488,438 | A | | 1/1996 | Cochran |
| 5,499,064 | A | * | 3/1996 | Vansaghi ............... G02C 7/088 351/158 |
| 5,521,653 | A | | 5/1996 | Anderson |
| 6,921,167 | B2 | * | 7/2005 | Nagata .................... G02B 7/002 351/158 |
| 7,048,371 | B1 | * | 5/2006 | Moore ..................... G02C 5/00 351/103 |
| 8,157,663 | B1 | | 4/2012 | Winkelsas et al. |
| 8,485,661 | B2 | | 7/2013 | Yoo et al. |
| 8,622,846 | B2 | | 1/2014 | Ahn |
| 8,708,484 | B2 | | 4/2014 | Reichow et al. |
| 8,985,765 | B2 | | 3/2015 | Reichow et al. |
| 9,028,060 | B2 | | 5/2015 | Schmitz |
| 9,314,376 | B1 | | 4/2016 | Sherer et al. |
| 9,519,159 | B1 | | 12/2016 | King |
| 9,709,828 | B2 | | 7/2017 | Farris |
| 9,956,468 | B2 | | 5/2018 | Turco |
| 2013/0053187 | A1 | | 2/2013 | Slater |
| 2014/0071398 | A1 | | 3/2014 | Glassco |
| 2014/0362336 | A1 | | 12/2014 | Schmitz |

* cited by examiner

*Primary Examiner* — Tuyen Tra

(74) *Attorney, Agent, or Firm* — Hilary J. Sumner

(57) ABSTRACT

A training device and method for aligning the position of an athlete's head for a given athletic endeavor. The device being comprised of a plurality of apertures within at least one opaque lens surface positioned in front of the athlete's eyes. Fixed or adjustable length orbitally positionable, modules may be placed in apertures within the desired viewing area to restrict peripheral vision. The remaining apertures are plugged to block light allowing the wearer to focus on the target area.

18 Claims, 10 Drawing Sheets

HEAD ALIGNMENT TRAINING DEVICE AND METHOD

CROSS REFERENCE TO RELATED APPLICATIONS

This application claims benefit of priority from U.S. Provisional Patent Application No. 62/773,811 of Joseph Winkelsas and Lisa Harwell filed Nov. 30, 2018, entitled HEAD ALIGNMENT TRAINING DEVICE AND METHOD the entirety of which is incorporated herein by reference.

STATEMENT REGARDING FEDERALLY SPONSORED RESEARCH/DEVELOPMENT

Not Applicable

PARTIES TO A JOINT RESEARCH AGREEMENT

Not Applicable

REFERENCE TO SEQUENCE LISTING, TABLE OR COMPUTER PROGRAM

Not Applicable

FIELD OF THE INVENTION

The present invention pertains generally to a head alignment training device and method. The disclosure relates more particularly to a head alignment training device and method comprised of a plurality of apertures within at least one opaque lens. The lens or lenses are mounted within a standard eyeglass frame or helmet or affixed to the athlete's head via a strap. The training device is comprised of selectively removeable plugs and adjustable modules that can be placed in one or more apertures to restrict the wearer's field of view, thereby allowing the user to focus on a specific task, activity or field of play.

BACKGROUND OF THE INVENTION

Prior Art

The following is a tabulation of the prior art revealed during a patent search that may be relevant:

| Patent/App. Number | Kind Code | Issue/Publication Date | Patentee |
| --- | --- | --- | --- |
| 9,956,468 | B2 | May 1, 2018 | Turco |
| 9,709,828 | B2 | Jul. 18, 2017 | Farris |
| 9,519,159 | B1 | Dec. 13, 2016 | King |
| 9,314,376 | B1 | Apr. 19, 2016 | Sherer et al. |
| 9,028,060 | B2 | May 12, 2015 | Schmitz |
| 8,985,765 | B2 | Mar. 24, 2015 | Reichow et al. |
| 8,708,484 | B2 | Apr. 29, 2014 | Reichow et al. |
| 8,622,846 | B2 | Jan. 7, 2014 | Ahn |
| 8,485,661 | B2 | Jul. 16, 2013 | Yoo et al. |
| 8,157,663 | B1 | Apr. 17, 2012 | Winkelsas et al. |
| 5,488,438 | N/A | Jan. 30, 1996 | Cochran |
| 5,521,653 | N/A | May 28, 1996 | Anderson |
| 5,177,510 | N/A | Jan. 5, 1993 | Peters et al. |
| 4,531,743 | N/A | Jul. 30, 1985 | Lott |
| 4,168,111 | N/A | Sep. 18, 1979 | Baines |
| 2014/0362336 | A1 | Dec. 11, 2014 | Schmitz |
| 2014/0071398 | A1 | Mar. 13, 2014 | Glassco |
| 2013/0053187 | A1 | Feb. 28, 2013 | Slater |

Creating the ideal muscle memory through repetition is essential in optimizing athletic performance. Regular practice of frequent and recurring movements required by a particular sport allows an athlete to perform without conscious thought. Unfortunately, peripheral vision may divert the individual's attention during practice, resulting in flawed mechanics. Athletes may believe that they are concentrating on the target but may instead be relying on peripheral vision. As previously noted, if the athlete's vision is not trained on the target, the head and body may be improperly aligned leading to incorrect form and compromised muscle memory.

A golfer, for instance, should maintain consistent eye contact with the initial position of the ball throughout the swing and follow through. If the athlete relies on peripheral vision or watches the ball as it leaves the tee, the individual's head will be improperly aligned and the ball will likely be driven off course. Similar problems may occur in a pitcher whose eyes are not trained on the catcher's mitt or a basketball player who is not focused on the rim of the basketball hoop.

It is difficult to maintain a steady head position while one's body is in motion. Reliance on peripheral vision leads to undesirable head movement as the eyes focus on distractions. Consequently, a device that restricts peripheral vision would be useful in maintaining focus. The range of peripheral vision often varies with the activity; therefore, a device with variable restriction on peripheral vision would be even more desirable, allowing the user to focus on a preferred target area and providing an environment that encourages proper form and strengthens muscle memory.

A variety of devices have been created to restrict peripheral vision during athletic training. Some devices offer an opaque surface with one or more holes, allowing the user to create a line of sight to the targeted area. The planar surface in these designs is often placed at a significant distance from the user's eye, creating a gap between the opaque surface and the user's face. These devices do not sufficiently restrict the user's peripheral vision as the light entering this gap may lead to distractions and excessive head movement.

Some designs employ vertical or horizontal slits or blinders placed on or within eyeglass frames. Others offer eyewear having filters with varying degrees of opacity or selectively shaped viewing areas. Because the user's eyes are so close to the slits, grids, or shaped openings on the glasses, the athlete's range of peripheral vision is still too great, resulting in excessive head movement as the eyes look to areas outside the target. Furthermore, the range of peripheral vision within these devices are fixed in size and cannot be adjusted in any way.

There is therefore a need in the art for a head alignment training device that conforms more closely to the wearer's face and allows the user to selectively restrict or expand peripheral vision. By optimizing the visible target area, the athlete's focus may be enhanced, allowing that athlete to maintain proper head alignment and improve muscle memory.

BRIEF SUMMARY OF THE INVENTION

The present invention addresses the problems discussed above by offering a head alignment training device and method having a plurality of selectively pluggable apertures within at least one opaque lens having a shape that substantially conforms to the curvature of a human face. This plane may be affixed to a standard pair of eyeglass frames or alternatively, may be mounted on or within a helmet, hat or goggles.

Each aperture can be capped or plugged, allowing line of sight only through the desired viewing apertures. Each aperture within the opaque lens surface is also designed to accommodate an articulating module. Once the athlete is in the ideal stance for the applicable activity, these modules can be orbitally rotated within the aperture, providing a line of sight to the chosen target for one or both eyes.

The articulating modules are interchangeable and comprised of fixed length barrels or adjustable length barrels. Leaf shutter mechanisms may also be added as described more fully below. The proximal end of each module is connected to the aperture either through complementary geometry or a simple mechanical fastening means. Snap-fit connections can also be used to quickly connect or disconnect the module from the aperture.

As noted above, modules having adjustable length barrels may be connected to the apertures. These barrels selectively extend or collapse to provide the desired field of view. An adjustment mechanism on the module allows the user to lengthen or shorten the barrel, thereby respectively narrowing or broadening the viewing area through the aperture. This can be accomplished by a variety of means comprising a collapsible accordion-style barrel, a set of concentric rings of material of decreasing size, or a continuously concentric ring of material commonly known as a helicoid.

Leaf shutter mechanisms similar to those used in a camera lens may also be employed to regulate the viewing area. The leaf shutter may be attached directly to the aperture or it can be incorporated within the fixed or adjustable length barrels described above. The rotation of the interconnected blades within the leaf shutter mechanism are controlled by an adjustment ring, allowing the user to open or close the shutter to respectively broaden or narrow the field of view.

Some sports require the athlete to look directly ahead while others require the athlete to look upward as in basketball or downward as in golf; consequently, a number of apertures may be needed. The head alignment training device will ideally comprise a minimum of two apertures and up to a maximum of eight apertures; however, it should be recognized that the head alignment training device may have as many apertures as the lens surface will reasonably accommodate.

Adjustable straps, hinges, or telescoping components allow the device to be adjusted to accommodate varying eye widths. A light obscuring liner is placed between the opaque lens or lenses and the user's face to prevent light gaps. A positionable laser may be optionally mounted to the head alignment training device allowing the user to point to the desired target, providing visual confirmation of steady head position. Additionally, a camera may be mounted to the device to track the user's head position and movement.

BRIEF DESCRIPTION OF THE SEVERAL VIEWS OF THE DRAWINGS

The present invention will be more easily understood by reading the detailed description in conjunction with the following drawings and reference numerals outlined below.

Figure 1A:
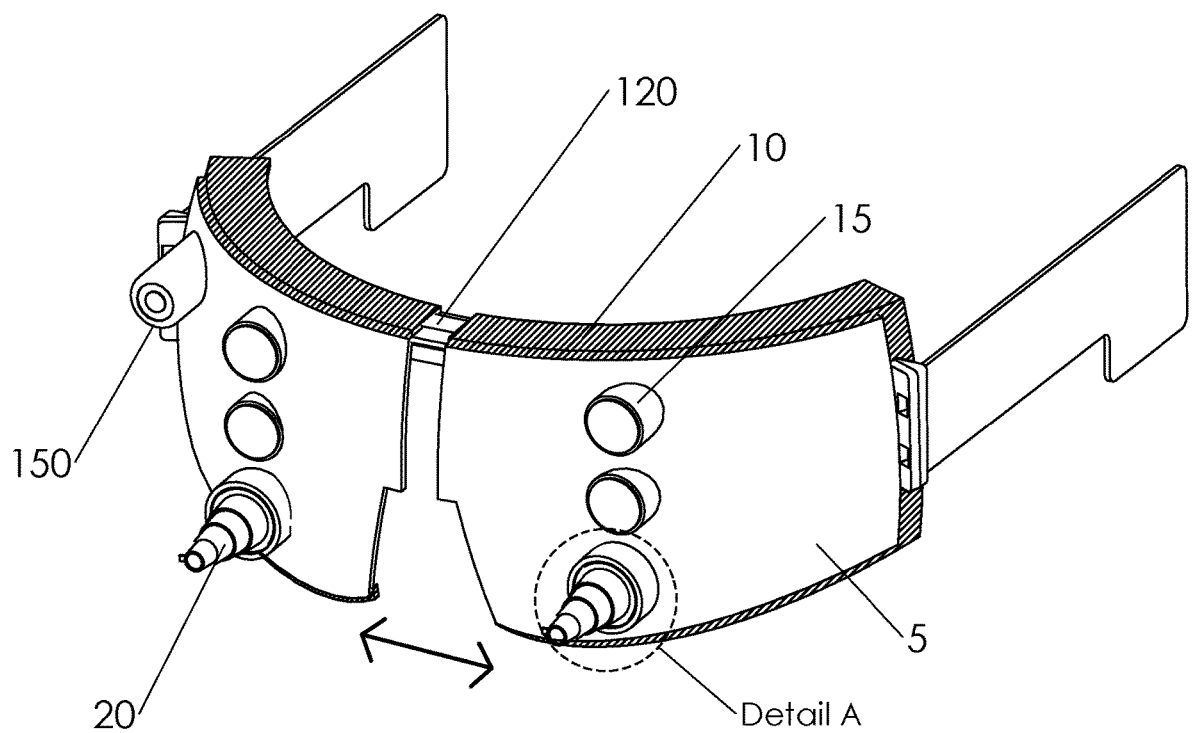
FIG. 1A is perspective view of the head alignment training device having adjustable length barrels within width-adjustable eyeglass frames.

| REFERENCE NUMERALS | |
|---|---|
| 5 | Opaque Lens Surface |
| 10 | Light Obscuring Liner |
| 15 | Aperture |
| 20 | Articulating Module |
| 25 | Plug/Cap |
| 30 | Proximal End of Articulating Module |
| 35 | Distal End of Articulating Module |
| 40 | Aperture Connection Mechanism |
| 45 | Securing Mechanism |
| 50 | Snap-Fit Connection |
| 55 | Fixed Length Barrel |
| 60 | Adjustable Length Barrel |
| 65 | Concentric Rings |
| 70 | Helicoid |
| 75 | Accordion-style Barrel |
| 80 | Leaf Shutter Mechanism |
| 85 | Overlapping Blades |
| 90 | Base |
| 95 | Pin |
| 100 | Actuating Ring |
| 105 | Channel |
| 110 | Viewing Area |
| 115 | Protrusion |
| 120 | Eyeglass Frame |
| 125 | Goggles |
| 130 | Hat/Helmet |
| 140 | Overlapping Sleeves |
| 145 | Hinge |
| 150 | Laser Pointer |

DETAILED DESCRIPTION OF THE INVENTION

Specific terminology is employed in the invention description for the sake of clarity. The invention is not intended to be limited to the precise terminology used and it should be understood that each specific element includes all technical equivalents operating in a similar manner to achieve a similar function. In this patent application holes, cavities, sockets, hollows, and voids will be generally referred to as "apertures" whether within the opaque lens surface or extending from it. Caps, lids, covers, and stoppers will be generally referred to as "plugs."

As discussed above, the head alignment training device is designed to provide the user with a variety of apertures in which to look through. By choosing the appropriate aperture or apertures and selectively rotating the module and reducing the available peripheral vision on each aperture, the user can target a very specific line of sight to assist in the applicable activity.

Figure 1B:
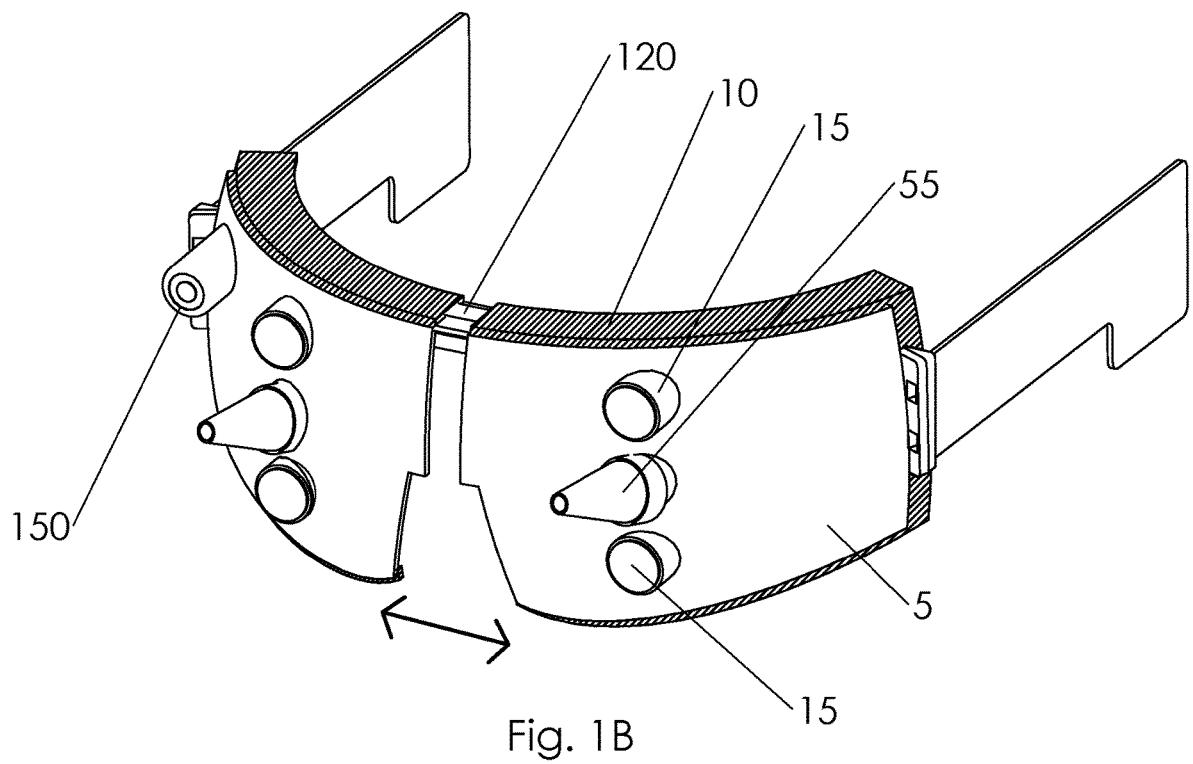
FIG. 1B is perspective view of the head alignment training device having fixed length conical barrels within width-adjustable eyeglass frames.
Figure 1C:
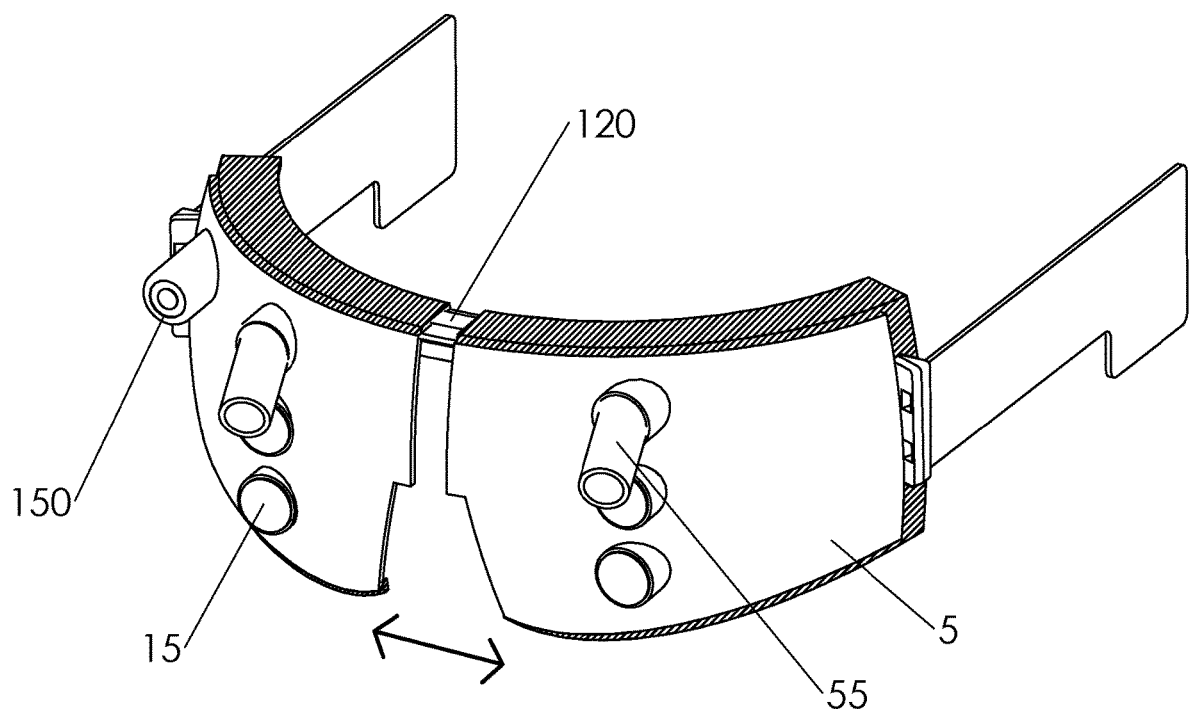
FIG. 1C is perspective view of the head alignment training device having fixed length cylindrical barrels within width-adjustable eyeglass frames illustrating the downward rotation of the orbitally adjustable articulating modules.

Referring now to FIGS. 1A-1C, the head alignment training device is comprised of an opaque lens surface 5, a light obscuring liner 10 and a plurality of apertures 15. The shape of the opaque lens surface 5 substantially conforms to the curvature of a human face to limit extraneous light. The light obscuring liner 10 is affixed to or an integral part of the periphery of the opaque lens surface 5. This liner 10 can be as simple as a layer of foam, a gasket or skirting between the opaque lens surface 5 and the user's face. The liner 10 provides a light barrier, restricting the user's vision to the open apertures 15.

As previously discussed, the head alignment training device can comprise as many apertures 15 as the opaque lens surface 5 will accommodate. Each lens surface 5 can reasonably be expected to comprise between two and eight apertures 15 to provide the user with a sufficient number of target viewing areas; however, it should be recognized that additional apertures 15 may be added to the device. These apertures 15 may be placed in any position on the opaque lens surface 5 provided that the user will be able to see through it.

Figure 8:
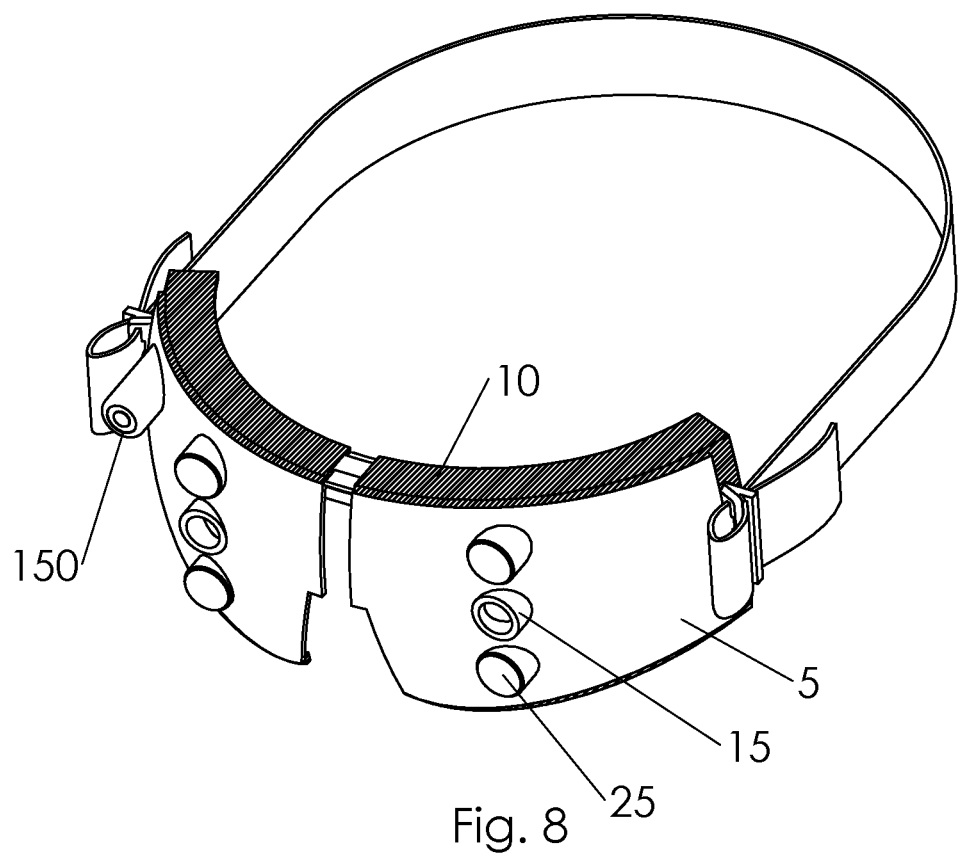
FIG. 8 is a perspective view of a head alignment training device in the form of goggles having adjustable straps and depicting caps on four of the apertures.

Each aperture 15 is designed to accommodate an articulating module 20 or a plug 25. These plugs 25 may be selectively placed on or in unused apertures 15 to block superfluous light and peripheral vision as shown in FIG. 8. The user may also place one or more articulating modules 20 in the desired apertures 15 to direct vision to the preferred target area as shown in FIGS. 1A-1C.

Figure 6:
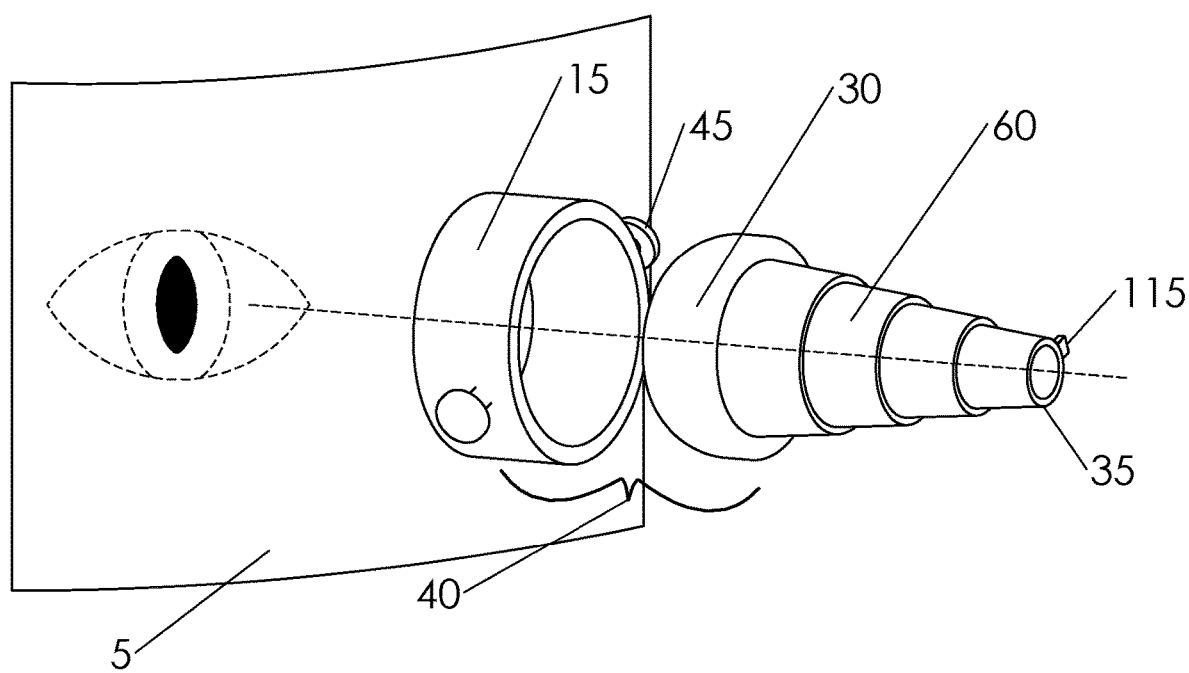
FIG. 6 is an exploded perspective view of an articulating module being placed within an aperture.

Each articulating module 20 has a proximal end 30 and a distal end 35 as shown in FIG. 6. The proximal end 30 is designed to fit and rotate orbitally within the selected aperture 15 using an aperture connection mechanism 40. This aperture connection mechanism 40 is comprised of complementing geometries between the aperture 15 and the proximal end 30 of the articulating module 20. FIG. 6 depicts one example of the aperture connection mechanism 40, illustrated as a ball and socket joint. The "ball" in this case is not a full sphere but a hollow portion of a sphere located on the proximal end 30 of the articulating module 20. The hollow nature of this partial sphere allows light to penetrate to the user's eye. The aperture 15 provides the "socket" as shown in FIG. 6 and is comprised of a cavity having sufficient depth and complementing geometry to securely connect to and allow the orbital rotation of the articulating module 20.

Figure 4A:
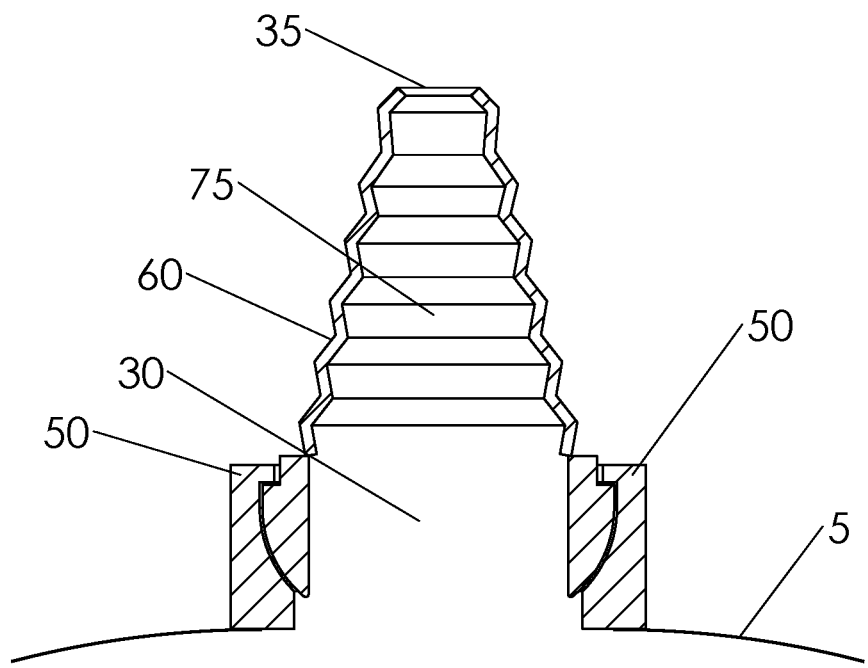
FIG. 4A is an elevational side view of an articulating module comprised of a collapsible accordion-style barrel fitted within an aperture.
Figure 4B:
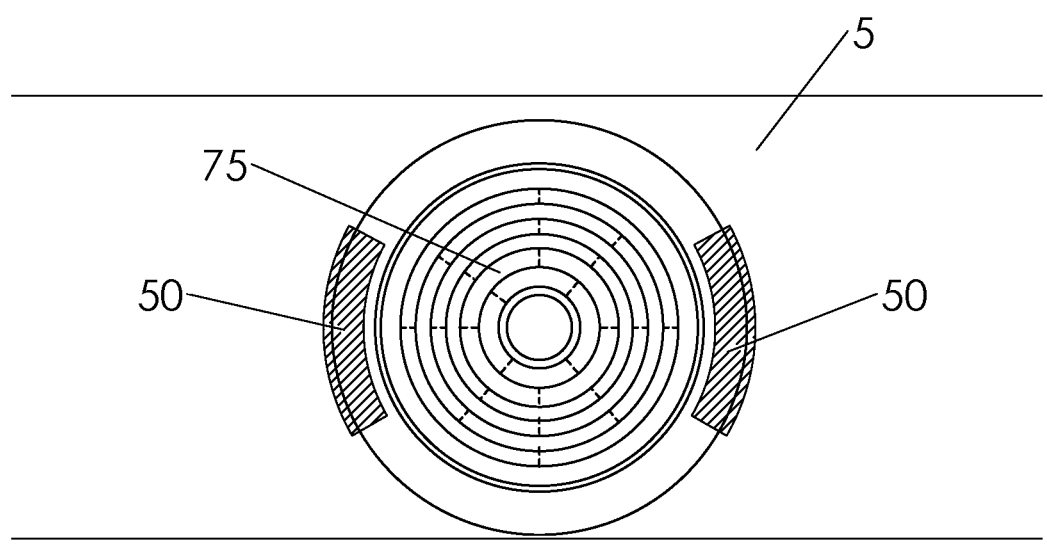
FIG. 4B is a top plan view of an articulating module comprised of an accordion-style barrel.

Once the articulating module 20 has been placed in the desired position, a securing mechanism 45 such as a pin, thumb screw or similar means may be used to maintain that orientation. Alternatively, tight tolerances between the geometry of the proximal end 30 of the articulating module 20 and aperture 15 may create sufficient friction to keep the articulating module 20 in place. Snap-fit connections 50 such as those depicted in FIGS. 4A and 4B can also be used to secure the articulating module 20 within the aperture 15, allowing the user to quickly join or disconnect the module 20 from the opaque lens surface 5. It should be recognized that a snap-fit connection 50 may encircle a lesser or greater portion of the proximal end 30 as depicted in FIGS. 4A and 4B, provided that the articulating module 20 remains securely seated within the aperture 15.

The distal end 35 of the articulating module 20 may be comprised of a fixed length barrel 55 or a barrel having an adjustable length 60. Fixed length barrels 55 may be comprised of a simple cylinder, cone, or other shape of the desired length as depicted in FIGS. 1B and 1C respectively.

Figure 2A:
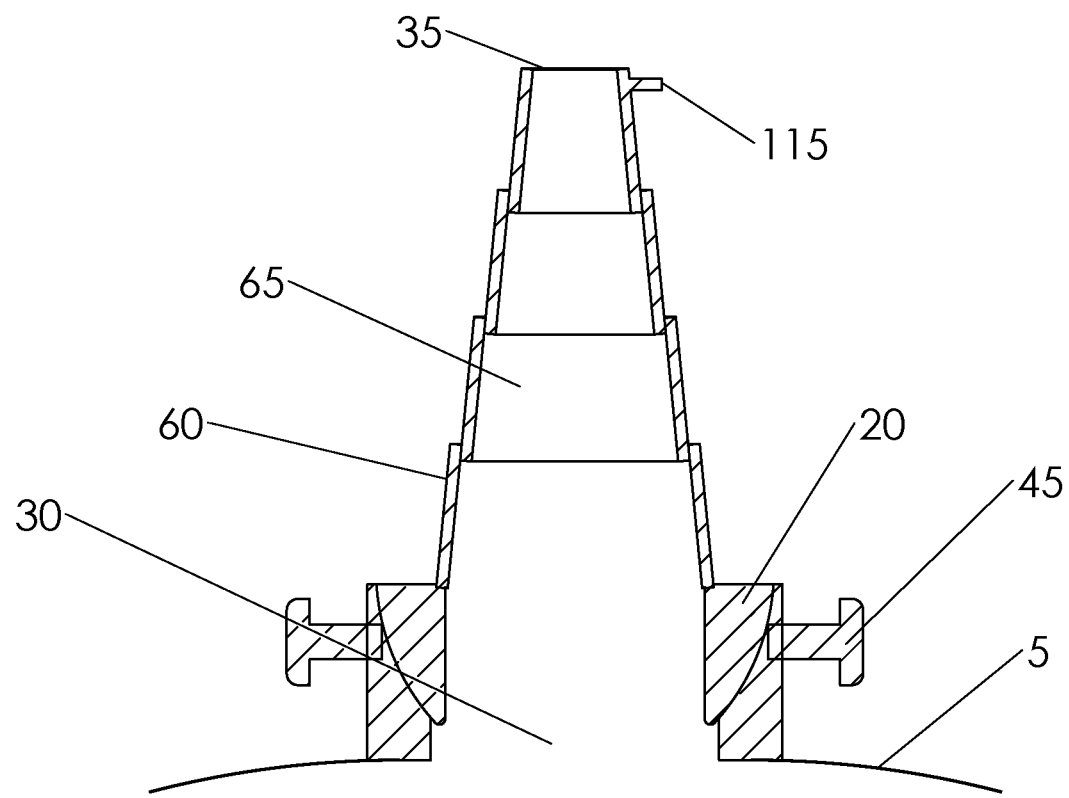
FIG. 2A is an elevational side view of detail A within FIG. 1A showing an articulating module comprised of telescoping nesting cylinders fitted within an aperture.
Figure 2B:
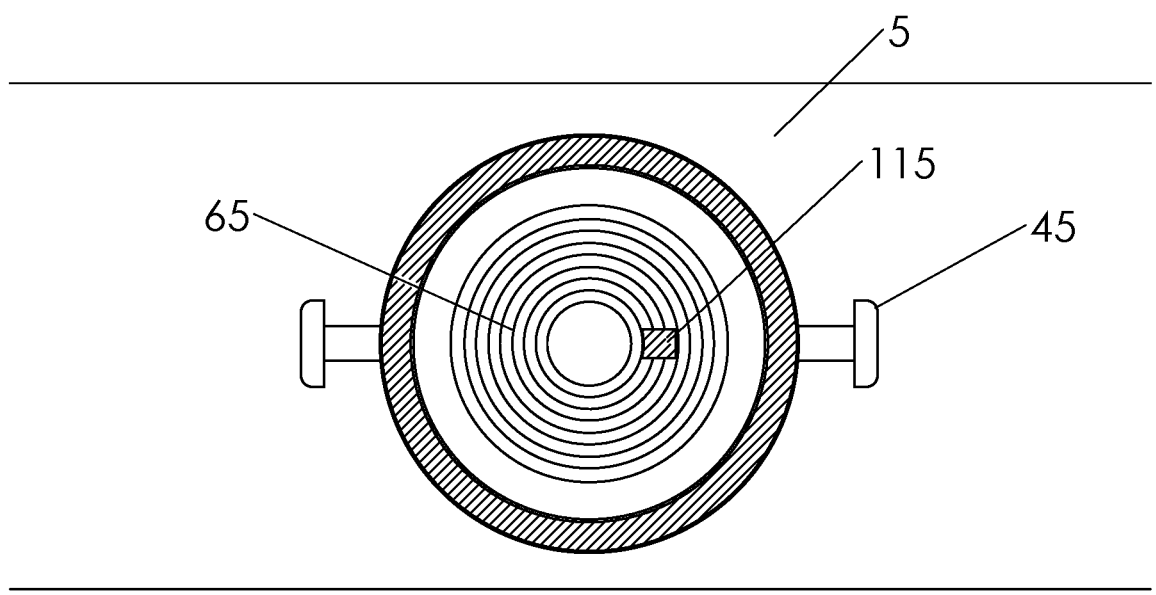
FIG. 2B is a top plan view of an articulating module comprised of nesting cylinders.

Referring now to FIGS. 2A, 2B, 3A, 3B, 4A and 4B, an adjustable length barrel 60 may also be used, allowing the athlete to selectively lengthen or shorten the barrel to achieve the desired peripheral vision. Adjustable length barrels 60 may take any number of forms. One adjustable length barrel 60 design comprises a set of nesting concentric rings 65. The rings may be made from any opaque material and decrease in size from the proximal to the distal end of the adjustable length barrel 60 as depicted in FIGS. 2A and 2B.

Figure 3A:
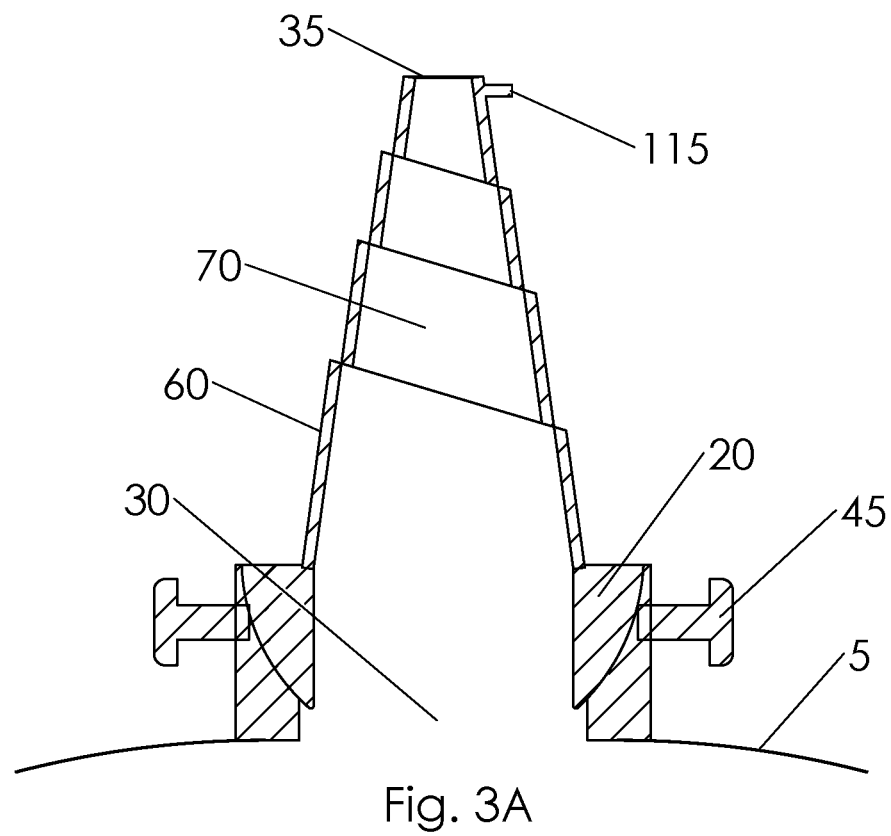
FIG. 3A is an elevational side view of an articulating module comprised of a single telescoping helicoid fitted within an aperture.
Figure 3B:
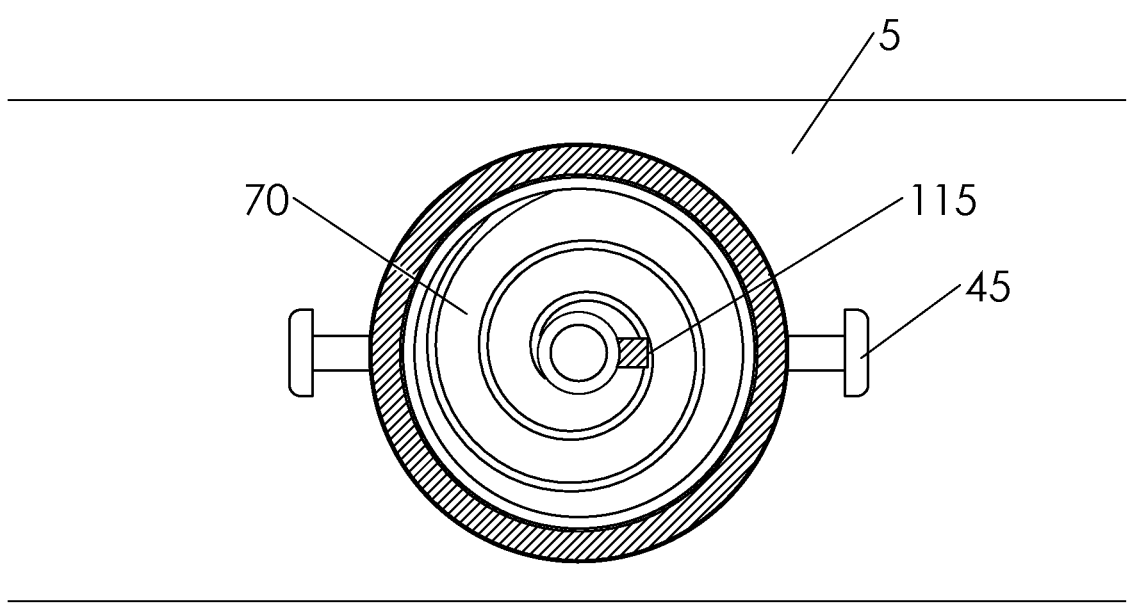
FIG. 3B is a top plan view of an articulating module comprised of a helicoid.

In another embodiment, shown in FIGS. 3A and 3B, a continuously concentric ring of opaque material is used. This helicoid 70 can be extended or retracted by manipulating a protrusion 115 or similar adjustment means on the helicoid 70.

In a third embodiment, shown in FIGS. 4A and 4B, a collapsible, accordion-style barrel 75 constructed of opaque material is used. In this design, folds of flexible material extend from the proximal end 30 of the accordion-style barrel 75 to the distal end 35 of that barrel, the folds gradually decreasing in circumference as depicted in FIG. 4A. Pushing on the distal end 35 of the accordion-style barrel 75 shortens its length while pulling on the distal end 35 lengthens it. The longer the accordion-style barrel 75, the more the user's peripheral vision will be restricted.

Figure 5A:
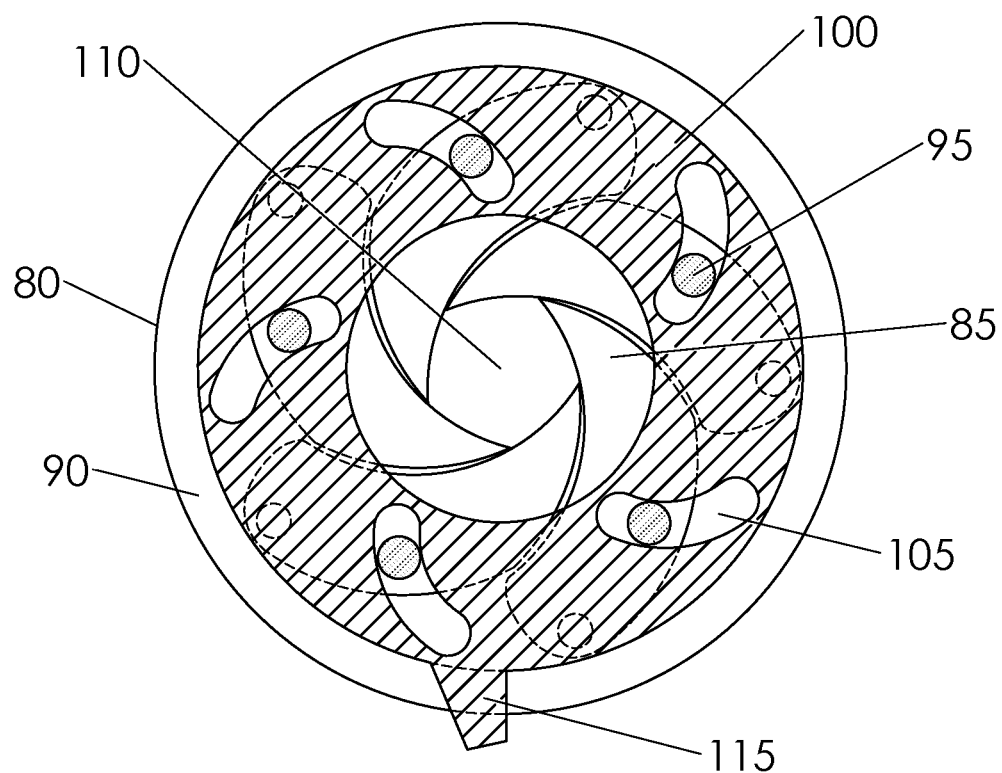
FIG. 5A is a top plan view of a leaf shutter mechanism.
Figure 5B:
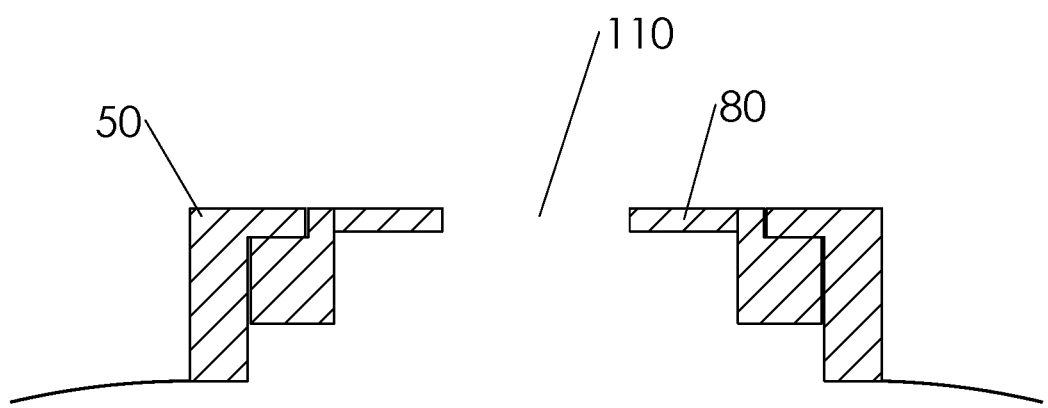
FIG. 5B is an elevational side view of a leaf shutter mechanism fitted within an aperture.

Referring now to FIGS. 5A and 5B, a leaf shutter mechanism 80 may be used to further limit the user's peripheral vision. This leaf shutter mechanism 80 can be employed as an individual articulating module 20 placed within an aperture as shown in FIG. 5B or alternatively, it may be included within a fixed length barrel 55 or an adjustable length barrel 60.

The leaf shutter mechanism 80 is comprised of a series of overlapping blades 85, each blade 85 being rotatably connected to a base 90 and having a pin 95 as shown in FIG. 5A. Each pin 95 is connected to an actuating ring 100 via a corresponding channel 105 in that actuating ring 100. Referring once again to FIG. 5A, rotation of the actuating ring 100 synchronizes the movement of each pin 95 via its corresponding channel 105. The overlapping blades 85 connected to these pins 95 subsequently rotate in or out of the viewing area 110 depending on the direction of rotation of the actuating ring 100. The more the overlapping blades 85 rotate into the viewing area 110, the more the user's peripheral vision will be restricted.

It should be understood that the actuating ring 100 may be connected to a protrusion 115, dial, or similar mechanism for easier adjustment of the leaf shutter mechanism 80. It should further be understood that the geometry and position of the overlapping blades 85 will determine the size of the viewing area 110 and subsequently, the extent that the peripheral vision will be obscured. In the example provided in FIG. 5A, the user can adjust the viewing area 110 such that no light enters, if desired allowing the leaf shutter mechanism 80 to substitute for a plug 25.

The opaque lens surface 5 may be mounted within a set of standard eyeglass frames or adjustable width frames 120 or goggles 125 as depicted in FIGS. 1A-1C and FIG. 8. The opaque lens surface 5 may also be attached on or within a hat or helmet 130 such as a batting helmet as shown in FIG. 7.

It should be recognized that users of the head alignment training device will have varying eye widths. The position of the apertures 15 within the opaque lens surface 5 can be customized for the user's specific eye width and placed within standard eyeglass frames. Alternatively, the width of the opaque lens surface 5 may be adjustable. Referring again to FIGS. 1A-1C and FIG. 8, the adjustable width frames 120 are designed with overlapping sleeves 140 allowing the user to position the desired apertures 15 in front of one or both eyes.

Figure 7:
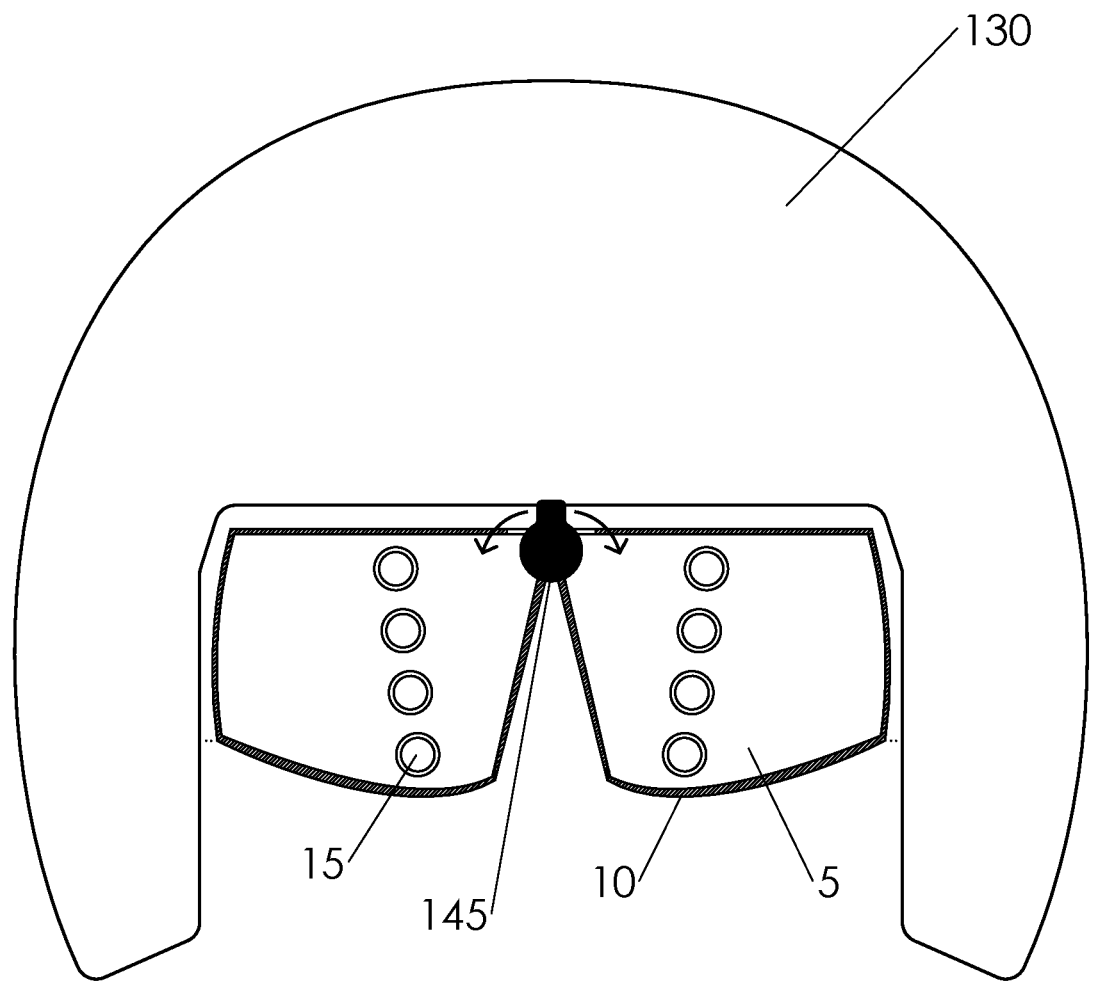
FIG. 7 is a front view of the head alignment training device mounted within a helmet via a hinge.

In another embodiment shown in FIG. 7, two opaque lens surfaces 5 are suspended from a hat or helmet 130 via a hinge 145. This hinge 145 may be comprised of a barrel hinge or similar pivoting fastener. One opaque lens surface 5 is positioned in front of the right eye and a second is positioned in front of the left eye. The hinge 145 allows the user to rotate each opaque lens surface 5, positioning the desired apertures 15 in front of one or both eyes much like the operation of binoculars.

Referring once again to FIGS. 1A-1C, an optional laser pointer 150 may be added to the opaque lens surface 5 or eyeglass frames 120. This laser pointer 150 may be directed to the desired target to assist in the adjustment of the articulating modules 20 and to provide visual confirmation of proper head alignment.

An optional camera may also be attached to the eyeglass frames 120, opaque lens surface 5 or to the helmet 130 allowing the user to record head motion and position.

While the above description contains many specifics, these should be considered exemplifications of one or more embodiments rather than limitations on the scope of the invention. As previously discussed, many variations are possible and the scope of the invention should not be restricted by the examples illustrated herein.

The invention claimed is:

1. A training aid for positioning an athlete's head, said training aid comprising:
    at least one opaque lens surface positioned in front of the athlete's eyes, said opaque lens surface having a periphery and plurality of pluggable apertures;
    a light obscuring liner affixed about the periphery of said opaque lens surface;
    one or more plugs selectively placed in said pluggable apertures;
    at least one articulating module placed in a pluggable aperture, the articulating module having a distal end; and
    a means for supporting and securing said opaque lens surface to the athlete's head.

2. The training aid of claim 1, wherein the distal end of the at least one articulating module is in the shape of a cylinder.

3. The training aid of claim 1, wherein the distal end of the at least one articulating module is in the shape of a cone.

4. The training aid of claim 1, wherein the distal end of the at least one articulating module is comprised of a set of nesting cylinders such that the length of the articulating module can be adjusted.

5. The training aid of claim 1, wherein the distal end of the at least one articulating module is comprised of material in the form of a helicoid such that the length of the articulating module can be adjusted.

6. The training aid of claim 1, wherein the distal end of the at least one articulating module is comprised of a collapsible accordion-style barrel such that the length of the articulating module can be adjusted.

7. The training aid of claim 1, further comprising a mechanism to hold the articulating module in a selected position.

8. The training aid of claim 1, wherein the plurality of pluggable apertures ranges from two to eight in number.

9. The training aid of claim 1, wherein one or more pluggable apertures further comprises a means for restricting light.

10. The training aid of claim 1, wherein the articulating module further comprises a means for restricting light.

11. The training aid of claim 1, further comprising a laser pointer.

12. The training aid of claim 1, further comprising a camera.

13. The training aid of claim 1, wherein the opaque lens surface is supported by standard eyeglass frames.

14. The training aid of claim 1, wherein the opaque lens surface is supported by a hat.

15. The training aid of claim 1, wherein the opaque lens surface is bifurcated and affixed to a barrel hinge.

16. The training aid of claim 1, wherein one opaque lens surface is placed in front of the athlete's right and a second opaque lens surface is positioned in front of the athlete's left eye, both opaque lens surfaces being supported by eyeglass frames having an adjustable width.

17. A method of aligning an athlete's head in an ideal position for a selected activity comprising the steps of:
    placing a training aid on the head of the athlete, said training aid comprising at least one opaque lens surface positioned in front of the athlete's eyes, each opaque lens surface having a periphery and a plurality of pluggable apertures, the training aid further comprising a light obscuring liner affixed about the periphery of each said opaque lens surface;
    creating a viewing area by selecting one or more pluggable apertures offering the ideal line of sight for a particular athletic activity;
    placing and moveably rotating an articulating module in each of the selected pluggable apertures to limit the viewing area; and
    placing plugs within the non-selected pluggable apertures.

18. The method of claim 17, further comprising the step of lengthening or shortening the articulating module to decrease or increase the viewing area.

\* \* \* \* \*